United States Patent [19]

Kunz

[11] 4,028,274
[45] June 7, 1977

[54] SUPPORT MATERIAL FOR A NOBLE METAL CATALYST AND METHOD FOR MAKING THE SAME

[75] Inventor: Harold Russell Kunz, Vernon, Conn.

[73] Assignee: United Technologies Corporation, Hartford, Conn.

[22] Filed: June 1, 1976

[21] Appl. No.: 691,921

[52] U.S. Cl. .............................. 252/447; 252/425.3; 252/444; 427/115

[51] Int. Cl.² ..................... B01J 21/18; B01J 23/42

[58] Field of Search ................ 252/425.3, 444, 447

[56] References Cited

UNITED STATES PATENTS

| | | | |
|---|---|---|---|
| 3,406,011 | 10/1968 | Zirngibl et al. | 252/444 X |
| 3,663,166 | 5/1971 | Weise et al. | 252/447 X |
| 3,804,916 | 4/1974 | Lalancette | 252/447 X |

Primary Examiner—Patrick P. Garvin
Attorney, Agent, or Firm—Stephen E. Revis

[57] ABSTRACT

A support material for platinum, platinum alloys, or other noble metal catalyst, is made from carbon particles by heat treating the carbon until it is at least partially graphitized, depositing a metal on the heat treated carbon particles which will catalyze the oxidation of graphite in an oxidizing atmopshere, and oxidizing the surfaces of the heat treated carbon particles at the sites of the catalyst crysals to pit or etch the surfaces at these sites. When this material is used as a support for platinum it reduces the rate of platinum migration when the supported platinum catalyst is heated in the presence of a liquid, thereby reducing the loss of platinum surface area which often occurs under these conditions.

22 Claims, No Drawings

SUPPORT MATERIAL FOR A NOBLE METAL CATALYST AND METHOD FOR MAKING THE SAME

BACKGROUND OF THE INVENTION

1. Field of the Invention

This invention relates to a platinum catalyst and more particularly to a platinum catalyst supported on heat treated carbon particles.

2. Description of the Prior Art

Platinum is a well-known catalyst used in electrochemical cells. Electrode performance in a cell is directly related to the amount of surface area of platinum which can be reached by the various reacting species within the cell. This fact, coupled with the high cost of platinum, has resulted in considerable effort to get platinum into a usable form which has maximum surface area per unit weight of platinum. The basic approach has been, and still is, to put the platinum on the surface of suitable particles called supports. Carbon particles and graphite particles are common platinum supports in the fuel cell art. Several well-known techniques exist for depositing platinum on such supports. For example, the support can be dispersed in an aqueous solution of chloroplatinic acid, dried, and exposed to hydrogen.

By the foregoing technique, and by other techniques, platinum crystals may be uniformly distributed and highly dispersed on the surfaces of the support particles so as to provide a very high surface area of platinum.

When this supported platinum is used at temperatures greater than 100° C in the presence of a liquid (or at higher temperatures in the presence of a gas) it has been found to lose surface area. This loss of surface area is particularly pronounced in an acid fuel cell environment, such as in fuel cells using phosphoric acid as the electrolyte, which operate at temperatures anywhere from 120° C and higher. The loss in surface area is dramatic during the first few hours of cell operation, but it continues at a slow but steady rate for a considerable period thereafter. A loss in cell performance is directly attributable to this loss in platinum surface area.

SUMMARY OF THE INVENTION

One object of the present invention is a method for making a supported noble metal catalyst, in particular a platinum catalyst, which, when heated in the presence of a liquid or gas, retains a higher catalyst surface area than supported noble metal catalysts made by prior art methods.

Accordingly, in the method of making a support material for a noble metal catalyst, wherein the support material is a carbon powder which is at least partially graphitized, the surfaces of the graphitized carbon particles are oxidized in the presence of a "metal oxidizing catalyst" to form pits in surfaces of the particles.

In a preferred embodiment the pitting is accomplished by depositing "metal oxidizing catalyst" crystallites on the surfaces of the graphitized particles, and oxidizing the surfaces of the particles at the crystallite sites. This results in pitting or etching of the surfaces at these sites. As used in this specification and in the appended claims the term "metal oxidizing catalyst" means a metal which will catalyze the oxidation of graphite in an oxidizing atmosphere. This metal oxidizing catalyst is removed, such as by leaching, prior to depositing the platinum on the support particles.

It can only be theorized as to why noble metals, such as platinum, supported on a graphitized carbon, lose surface area when heated in the presence of a liquid. In the case of platinum, it is believed that individual crystals of platinum migrate from exposed surfaces of the graphitized particles to the crevices or junctures formed where particles abut one another; these crystals accumulate in the crevices, agglomerating with other crystals thereby reducing the effective platinum surface area. This reduction in surface area is not significant unless the supported catalyst is heated and is more severe in the presence of a liquid than in the presence of a gas. This is a serious problem when the catalyst is used in a fuel cell wherein operating temperatures are typically greater than 120° C, and the catalyst is in contact with a liquid electrolyte, such as phosphoric acid. It is believed that by pitting or etching the surface of the graphitized or partially graphitized carbon particles, in accordance with the process of the present invention, the platinum crystallites are held more securely in these pits thereby reducing migration and loss of surface area. Some examples of other noble metal catalysts which it is believed would behave in a manner similar to platinum are gold, palladium, ruthenium, iridium and alloys thereof.

The foregoing and other objects, features, and advantages of the present invention will become more apparent in the light of the following detailed description of the preferred embodiments thereof.

DESCRIPTION OF THE PREFERRED EMBODIMENTS

In accordance with one embodiment of the present invention a carbon black powder is heat treated at temperatures above 1250° C until it is at least partially graphitized. As used in this specification and appended claims, "partially graphitized" means that the mean d spacing in the carbon crystallite structure is greater than 3.44 A, which is the mean d spacing of completely non-graphitic carbon as discussed in the Kirk-Othmer Encyclopedia of Chemical Technology, Second Edition, Vol. 4, pp. 306–308, John Wiley & Sons, Inc. (1964). A metal is selected which will catalyze the oxidation of graphite in an oxidizing atmosphere such as in air, carbon dioxide, or fluorine. Some suitable metals are iron, lead, copper, silver, and platinum. Tests conducted using iron, lead, copper, and platinum have shown that iron and lead work best and are therefore preferred. The metal, preferably in the form of an aqueous salt solution, is mixed with the heat treated particles to form a slurry. Water is removed from the slurry by evaporation and the salt is decomposed to convert it to a metal by heating or reduction. In this manner metal crystallites are uniformly dispersed over the surfaces of the heat treated particles. The particles are then subjected to an oxidizing atmosphere at temperatures high enough to oxidize the particles at the locations or sites of the metal crystallites. However, these temperatures are chosen such that they are not high enough to oxidize the particles in areas lacking catalyst crystallites in order to prevent undesired loss of graphite material. The proper temperature range can readily be determined by a person having ordinary skill in the art. Oxidation may be accomplished in either a conventional furnace or in a fluidized bed. Finally, the crystallites of metal oxidizing catalyst are leached out, leaving pits or channels on the surface of the particles at the former sites of the crystallites. The oxidized particles are now ready for platinum deposition which can be accomplished by any of several well-known techniques, such as the one described in the Background of the Invention. The supported platinum catalyst is now ready for use, such as in a fuel cell.

Although the metal oxidizing catalyst is preferably in the form of a salt solution when mixed with the heat treated particles, the catalyst could be in the form of a colloid of the metal itself, the colloid of a compound of the metal, or in any other form suitable for dispersing the metal crystallites on the surface of the graphitized particles such as in the form of an acid. Some examples of suitable solutions are ferric formate, copper acetate, lead acetate, ferric nitrate, silver nitrate, chloroplatinic acid, etc.

EXAMPLE

A platinum support material was prepared from Vulcan XC-72 which is a non-graphitized furnace carbon black powder manufactured by Cabot Corporation, Boston, Massachusetts. The powder was completely graphitized by heating to 2800° C for 30 minutes. This graphite powder was added to an aqueous solution of ferric formate; the mixture was stirred and heated for a 3-4 hour period to remove the liquid water. It was then further heated in a vacuum at 150° C to remove additional water and to decompose the ferric formate. It was then agitated in a blender to decrease its bulk density. The final iron content was 0.1%. Approximately 3 grams of this mixture was placed in a tube furnace and heated in nitrogen to the temperature at which exposure to oxygen was desired. Pure oxygen was then applied to the sample at the graphite oxidation temperature of about 500° C for about ½ minute (the proper time and temperature depends on the nature and concentration of the metal oxidizing catalyst used). The material was then cooled in nitrogen to prevent oxidation during the cool down period, removed from the furnace, stirred and weighed. This procedure of placing the sample in the furnace, oxidizing the graphite, and removing it from the furnace was repeated several times. The stirring during this procedure was necessary to insure that the powder was being uniformly oxidized. This procedure was continued until the weight of the material indicated a loss of weight of 15% as a result of the oxidation of the graphite particles at the metal crystallite sites. The sample was then washed in 50% $HNO_3$ solution and then washed with water to remove the iron and finally dried at 110° C in a vacuum oven. The support material was then catalyzed with platinum by the thermal decomposition of diamminoplatinum (II) dinitrite.

For comparison purposes samples of platinum catalyst were prepared using supports of unoxidized Vulcan XC-72 which had been graphitized in the same manner as above. Samples of both types were tested under simulated fuel cell operating conditions as follows: 98% $H_3PO_4$ at 325° F for 24 hours at an electrode potential of 0.65 V with respect to a hydrogen electrode in the same electrolyte. The initial platinum surface area of both types of samples was approximately 98 square meters per gram of platinum. The average decrease in platinum surface area after 24 hours for the unoxidized graphite support average about 23%, whereas the average decrease in platinum area for the oxidized graphite support after 24 hours averaged about 8%. After the first 24 hours the rates of platinum surface area loss taper off to about the same level for both types of samples; however, the advantage gained during the first 24 hours by the samples prepared according to the present invention is never lost.

A variety of different samples were prepared and tested in an effort to determine how various parameters affect the process. From these tests it was determined that the mere oxidation of a graphitized support material without the presence of a metal oxidizing catalyst has no significant effect on reducing platinum surface area loss.

Platinum surface area loss was also determined to be independent of, for example, the iron concentration on the graphite support during oxidation in the range of 0.1% Fe to 10% Fe. Furthermore, increasing the test temperature from 325° F simply caused an increase in the rate of platinum surface area loss for both types of samples; the samples prepared according to the present invention still reduced platinum surface area loss to a significantly greater extent than the unoxidized support samples. It should also be noted that the method by which the platinum is deposited upon the support is unimportant for the purposes of the present invention.

Samples were also made and tested using platinum as the metal oxidizing catalyst. This eliminated the necessity for leaching out the metal oxidizing catalyst and also for depositing platinum upon the oxidized support. Although tests showed the percent of platinum surface area loss under typical fuel cell operating conditions was significantly reduced, only a relatively low initial platinum surface area could be obtained. Thus, although platinum works as an oxidizing catalyst, other metals were determined to be more suitable.

From analysis of test results, it is estimated that satisfactory results will be obtained if the support is oxidized to the extent of at least a 10% weight loss, with a 14 to 20% weight loss being preferred. Weight losses greater than 30% are unnecessary to provide the desired features of this invention and may be detrimental. Weight losses less than 10% are likely to result in inadequate pit formation to stabilize the platinum catalyst against loss of surface area.

Platinum on supports made according to the present invention can be used anywhere a platinum supported on carbon catalyst is needed, but are particularly useful in an environment wherein they will be exposed to a liquid and wherein the temperature is greater than about 100° C. One such environment is in a liquid electrolyte fuel cell. For example, the catalyst may be admixed in an aqueous dispersion of fluorocarbon binder, such as polytetrafluoroethylene; the catalyst/binder is deposited, such as by filtering, as a layer on the surface of a carbon paper substrate to form an electrode. An electrolyte retaining matrix is disposed between a pair of these electrodes to form a fuel cell.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. In the process for making a noble metal catalyst support material from carbon, the steps of:

heat treating a carbon powder at temperatures above about 1250° C to at least partially graphitize the carbon;

depositing a metal oxidizing catalyst on the surfaces of the heat treated carbon particles; and oxidizing the surfaces of the heat treated carbon particles at temperatures sufficiently high to cause oxidation of the surfaces at the sites of the metal oxidizing catalyst, but not high enough to oxidize the heat treated carbon at the locations where no metal oxidizing catalyst is present.

2. The process according to claim 1 including the further step of removing the metal oxidizing catalyst from the surfaces of the heat treated particles.

3. The process according to claim 2 wherein the metal oxidizing catalyst is selected from the group consisting of iron, copper, lead, and silver.

4. The process according to claim 2 wherein the step of heat treating the carbon powder includes fully graphitizing the carbon.

5. The process for making a supported noble metal catalyst support material according to claim 1 wherein the step of depositing metal oxidizing catalyst crystallites includes mixing the heat treated carbon particles in an aqueous salt solution of the metal oxidizing catalyst; removing the water and decomposing the salt to convert it to the metal.

6. In the method for making a supported platinum catalyst the steps of:

heat treating a carbon powder at temperatures above about 1250° C to at least partially graphitize the carbon;

depositing a metal oxidizing catalyst on the surfaces of the heat treated carbon particles;

oxidizing the surfaces of the heat treated carbon particles in the presence of the metal oxidizing catalyst at a temperature sufficiently high to cause oxidation of the surfaces at the sites of the metal oxidizing catalyst, but not high enough to oxidize the heat treated carbon surfaces where no metal oxidizing catalyst is present;

removing the metal oxidizing catalyst; and depositing platinum on the oxidized particles.

7. The method for making a supported platinum catalyst according to claim 6 wherein the metal oxidizing catalyst is selected from the group consisting of lead, copper, iron and silver.

8. The method for making a supported platinum catalyst according to claim 7 wherein the step of depositing metal oxidizing catalyst includes mixing the heat treated carbon particles in an aqueous salt solution of the metal oxidizing catalyst; removing the water and decomposing the salt to convert it to the metal.

9. In the method for making a supported platinum catalyst the steps of:

depositing metal oxidizing catalyst crystallites on the surfaces of fully graphitized carbon support particles;

oxidizing the surfaces of the support particles only at the sites of the metal oxidizing catalyst crystallites;

removing the metal oxidizing catalyst crystallites; and depositing platinum on the oxidized support particles.

10. The method according to claim 9 wherein the step of depositing metal oxidizing catalyst crystallites includes mixing the graphitized support particles in an aqueous salt solution of the metal oxidizing catalyst; removing the water and decomposing the salt to convert it to the metal.

11. The method according to claim 9 wherein the metal oxidizing catalyst crystallites are iron.

12. The method according to claim 10 wherein the metal oxidizing catalyst crystallites are iron and the salt of the metal is ferric formate.

13. The method according to claim 9 wherein the step of oxidizing is continued until the graphitized support material has lost between 10 and 30% of its weight.

14. The method according to claim 10 wherein the step of oxidizing is continued until the graphitized support material has lost between 14 and 20% of its weight.

15. A platinum catalyst support material made from carbon according to the following process:

heat treating a carbon powder at temperatures above about 1250° C to at least partially graphitize the carbon;

depositing a metal oxidizing catalyst on the surfaces of the heat treated carbon particles; and oxidizing the surfaces of the heat treated carbon particles at temperatures sufficiently high to cause oxidation of the surfaces at the sites of the metal oxidizing catalyst, but not high enough to oxidize the heat treated carbon at the locations where no metal oxidizing catalyst is present.

16. A platinum catalyst support material according to claim 15 including the further step of removing the metal oxidizing catalyst from the surfaces of the heat treated particles.

17. A platinum catalyst support material according to claim 16 wherein the metal oxidizing catalyst is selected from the group consisting of iron, copper, lead, and silver.

18. A platinum catalyst support material according to claim 16 wherein the step of heat treating the carbon powder includes fully graphitizing the carbon.

19. A platinum catalyst support material according to claim 15 wherein the step of depositing metal oxidizing catalyst crystallites includes mixing the heat treated carbon particles in an aqueous salt solution of the metal oxidizing catalyst; removing the water and decomposing the salt to convert it to the metal.

20. A supported platinum catalyst made according to the following process:

heat treating a carbon powder at temperatures above about 1250° C to at least partially graphitize the carbon;

depositing a metal oxidizing catalyst on the surfaces of the heat treated carbon particles;

oxidizing the surfaces of the heat treated carbon particles in the presence of the metal oxidizing catalyst at a temperature sufficiently high to cause oxidation of the surfaces at the sites of the metal oxidizing catalyst, but not high enough to oxidize the heat treated carbon surfaces where no metal oxidizing catalyst is present;

removing the metal oxidizing catalyst; and depositing platinum on the oxidized particles.

21. A supported platinum catalyst according to claim 20 wherein the metal oxidizing catalyst is selected from the group consisting of lead, copper, iron and silver.

22. A supported platinum catalyst according to claim 21 wherein the step of depositing metal oxidizing catalyst includes mixing the heat treated carbon particles in an aqueous salt solution of the metal oxidizing catalyst; removing the water and decomposing the salt to convert it to the metal.

* * * * *

UNITED STATES PATENT OFFICE
CERTIFICATE OF CORRECTION

PATENT NO. : 4,028,274
DATED : June 7, 1977
INVENTOR(S) : Harold Russell Kunz

It is certified that error appears in the above-identified patent and that said Letters Patent are hereby corrected as shown below:

Claim 5, Column 5, Line 21: delete "supported"

Signed and Sealed this

Twenty-seventh Day of September 1977

[SEAL]

Attest:

RUTH C. MASON
Attesting Officer

LUTRELLE F. PARKER
Acting Commissioner of Patents and Trademarks